(12) United States Patent
Vatani et al.

(10) Patent No.: US 12,246,485 B2
(45) Date of Patent: Mar. 11, 2025

(54) THREE-DIMENSIONAL ("3D") PRINTING APPARATUS WITH COUNTER-ROTATING ROLLER

(71) Applicant: Sakuu Corporation, San Jose, CA (US)

(72) Inventors: Morteza Vatani, Los Gatos, CA (US); Siamak Azizi, Los Gatos, CA (US); Seyed Mohammad Sajadi, San Jose, CA (US); Steven Zhichao Shi, Santa Clara, CA (US)

(73) Assignee: Sakuu Corporation, San Jose, CA (US)

( * ) Notice: Subject to any disclaimer, the term of this patent is extended or adjusted under 35 U.S.C. 154(b) by 156 days.

(21) Appl. No.: 17/842,701

(22) Filed: Jun. 16, 2022

(65) Prior Publication Data

US 2023/0016497 A1    Jan. 19, 2023

Related U.S. Application Data

(63) Continuation-in-part of application No. 17/375,781, filed on Jul. 14, 2021.

(51) Int. Cl.
*B29C 64/165* (2017.01)
*B29C 64/386* (2017.01)
(Continued)

(52) U.S. Cl.
CPC .......... *B29C 64/165* (2017.08); *B29C 64/386* (2017.08); *B33Y 10/00* (2014.12);
(Continued)

(58) Field of Classification Search
CPC ... B29C 64/165; B29C 64/386; B29C 64/393; B29C 64/371; B33Y 10/00; B33Y 30/00;
(Continued)

(56) References Cited

U.S. PATENT DOCUMENTS 4,800,102 A  *  1/1989  Takada ................... B05B 12/20
                                                    118/301
5,934,343 A      8/1999  Gaylo
(Continued)

FOREIGN PATENT DOCUMENTS

CA    2227672 A1    7/1998
EP    0906801 B1    8/2004
(Continued)

OTHER PUBLICATIONS

International Search Report and Written Opinion issued Sep. 23, 2022 in corresponding PCT/US2022/037160.
(Continued)

*Primary Examiner* — Nahida Sultana
(74) *Attorney, Agent, or Firm* — Arman Khosraviani

(57) ABSTRACT

A three-dimensional ("3D") printing system for printing on a substrate, the printing system including a powder distribution device dispensing powder on the substrate and including a blade-shaped end, the blade-shaped end disposed at a height above the substrate; a powder uniformization device located at a distance from the powder distribution device along a direction substantially parallel to a longitudinal axis of the substrate; one or more sensors disposed upstream from the powder uniformization device and configured to determine one or more parameters of a thickness of the dispensed powder at one or more locations; and a control apparatus configured to determine whether the one or more parameters of the thickness is above a predetermined threshold value, and if the one or more parameters is determined to be above the predetermined threshold value, to adjust the powder distribution device.

20 Claims, 7 Drawing Sheets

(51) Int. Cl.
  *B33Y 10/00* (2015.01)
  *B33Y 30/00* (2015.01)
  *B33Y 40/00* (2020.01)
  *B33Y 50/00* (2015.01)

(52) U.S. Cl.
  CPC .............. *B33Y 30/00* (2014.12); *B33Y 40/00* (2014.12); *B33Y 50/00* (2014.12)

(58) Field of Classification Search
  CPC .......... B33Y 40/00; B22F 12/55; B22F 12/57; B22F 12/63; B22F 12/67
  See application file for complete search history.

(56) References Cited

U.S. PATENT DOCUMENTS

| | | | |
|---|---|---|---|
| 2011/0190923 A1 | 8/2011 | Matsui et al. | |
| 2015/0367448 A1* | 12/2015 | Buller ...................... | H05B 6/68 219/74 |
| 2017/0341365 A1 | 11/2017 | De Lajudie et al. | |
| 2018/0207872 A1* | 7/2018 | Klein .................... | B29C 64/153 |
| 2019/0193150 A1 | 6/2019 | Hudelson et al. | |
| 2020/0346408 A1 | 11/2020 | Rode et al. | |
| 2021/0206155 A1 | 7/2021 | Hartmann | |
| 2022/0088685 A1* | 3/2022 | Kenworthy ............. | B22F 10/28 |

FOREIGN PATENT DOCUMENTS

| | | |
|---|---|---|
| WO | 2018195502 A1 | 10/2018 |
| WO | 2019159644 A1 | 8/2019 |

OTHER PUBLICATIONS

International Search Report and Written Opinion issued Sep. 23, 2022 in related PCT/US2022/037166.
Final Office Action issued Jul. 21, 2023 in corresponding U.S. Appl. No. 17/375,781, filed Jul. 14, 2021 (43 pages).
Related U.S. Appl. No. 17/842,680, filed Jun. 16, 2022.

\* cited by examiner

THREE-DIMENSIONAL ("3D") PRINTING APPARATUS WITH COUNTER-ROTATING ROLLER

TECHNICAL FIELD

Various aspects of the current application relate to a three-dimensional ("3D") printing apparatus with improved powder deposition of thin layers. Specifically, various aspects relate to a 3D printing apparatus having a counter-rotating roller and powder feeder configured as a blade, both the counter-rotating roller and the blade having an independently adjustable height.

BACKGROUND

The introduction of three-dimensional ("3D") printing has generated a high degree of interest in the potential for a faster and more economical manufacturing approach. 3D printers may typically employ powder-bed technology, but with different approaches to fixing the powder into the desired configuration. Also, jetted binder 3D printers may benefit from the ability to rapidly deposit a full layer of powder and fix the desired pattern with a high-speed ink jet-like print head. The most significant limiting factor of a jetted binder-type 3D printer is the restriction to a single material within each layer.

Typical powder-bed 3D printing relies on the successive deposition of various layers on top of one another, or the generation of a foundation on which to deposit layers on a layer-by-layer basis. Depositing thin layers in the order of 25 μm to 200 μm on a substrate is typically difficult to achieve because of friction generated by the powders and low flowability of the powders. In addition, compacting a deposited thin layer is typically difficult to achieve. In some systems that deposit a powder or a slurry, in order to uniformize the deposited powder or slurry, existing systems typically rely on a blade to level the powder or slurry and to promote a uniform deposition in 3D printing systems. However, such blades, particularly flat blades, may impose sheer forces to the deposited powder or slurry that may disturb uniformity of the deposited powder or slurry and may thus prevent or hinder the formation of thin layers. Other systems rely on counter-rotating rollers to promote uniformity of the deposited powder. However, though they enable the use of lower flowability powders, counter-rotating rollers may suffer from the accumulation of powder in front of the roller, and non-uniform compacting of the powder because of, i.e., the sheer forces applied to the powder by the roller. In addition, as the deposited powder has a non-uniform thickness, the powder may accumulate in front of the roller and have a decreasing thickness the further it is from the roller. Also, as powder accumulates in front of the roller, the powder may be unable to rotate under the action of the roller and may instead slide under the roller, which increases the compaction of the powder, creates a non-uniform deposition of the powder, and results in a poor 3D printed product.

SUMMARY

In one general aspect, the instant application describes a three-dimensional ("3D") printing system for printing on a substrate, the printing system including a powder distribution device dispensing powder on the substrate and including a blade-shaped end, the blade-shaped end disposed at a height above the substrate; a powder uniformization device located at a distance from the powder distribution device along a direction substantially parallel to a longitudinal axis of the substrate; one or more sensors disposed upstream from the powder uniformization device and configured to determine one or more parameters of a thickness of the dispensed powder at one or more locations; and a control apparatus configured to determine whether the one or more parameters of the thickness is above a predetermined threshold value, and if the one or more parameters is determined to be above the predetermined threshold value, to adjust the powder distribution device.

The above general aspect may include one or more of the following features. For example, the first direction opposes the second direction. A lower surface of a blade-shaped end of each powder feeder is parallel to the substrate. Additionally, the powder uniformization device may include a roller. The substrate may be movable with respect to the printing system along a longitudinal axis, and the printing system may be static with respect to the longitudinal axis. Alternatively, the printing system may be movable with respect to the substrate along the longitudinal axis, and the substrate may be static with respect to the longitudinal axis. Alternatively, both the printing system and the substrate may be movable with respect to each other along the longitudinal axis.

For another example, a distance between a lowest contact point of the powder uniformization device to the substrate and each blade-shaped end is equal to about one radius of the powder uniformization device. Further, each powder feeder is located along a longitudinal axis of the printing system. Additionally or alternatively, each powder feeder is located along a longitudinal axis of the substrate. In embodiments, each powder feeder is synchronized depending on which direction the powder feeders are moving relative to the substrate. Alternatively or additionally, each powder feeder is synchronized depending on which direction the substrate is moving relative to the powder feeders.

The printing system may further include a vibrating device configured to vibrate the powder uniformization device at a specific frequency. Alternatively, the print station may further include a vibrating device configured to vibrate the substrate. In embodiments, the powder uniformization device rotates in one direction for a first powder feeder and an opposite direction for a second powder feeder. Additionally or alternatively, each powder feeder includes at least one of a dehumidifier, a heating element, and an inert gas enclosed therein. The printing system may further include a cleaning device configured to remove residual powder from the powder uniformization device. The cleaning device may be configured to apply an electric charge to the powder uniformization device. The printing system further includes at least one of a fixing device and a binder printer. The activation of the powder feeders may be synchronized with a direction of travel of one or more of the powder feeders and the substrate. The plurality of powder feeders is configured to dispense more than one material.

In another general aspect, the instant application describes a method for printing, the method including dispensing a powder on a substrate using a powder distribution device having a blade-shaped end, the blade-shaped end disposed at a height above the substrate; determining one or more parameters of a thickness of the dispensed powder at one or more locations using one or more sensors disposed upstream from a powder uniformization device; determining whether the one or more parameters is above a predetermined threshold value; and adjusting the powder distribution device in response to the one or more parameters being determined to be above the predetermined threshold value.

In another aspect, the uniformization device rotates in a first direction to uniformize the first powder and a second direction to uniformize the second powder, wherein the first and second directions of the uniformizing device rotation oppose the first and second directions of powder distribution, respectively.

In a further aspect, the method includes synchronizing a direction of the uniformization device based on a direction the substrate is moving relative to the first and second powder feeders. Alternatively, the method includes synchronizing a direction of the uniformization device based on directions of the first and second powder feeders are moving relative to the substrate.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Additional advantages and novel features of these various implementations will be set forth in part in the description that follows, and in part will become more apparent to those skilled in the art upon examination of the following or upon learning by practice of the invention.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
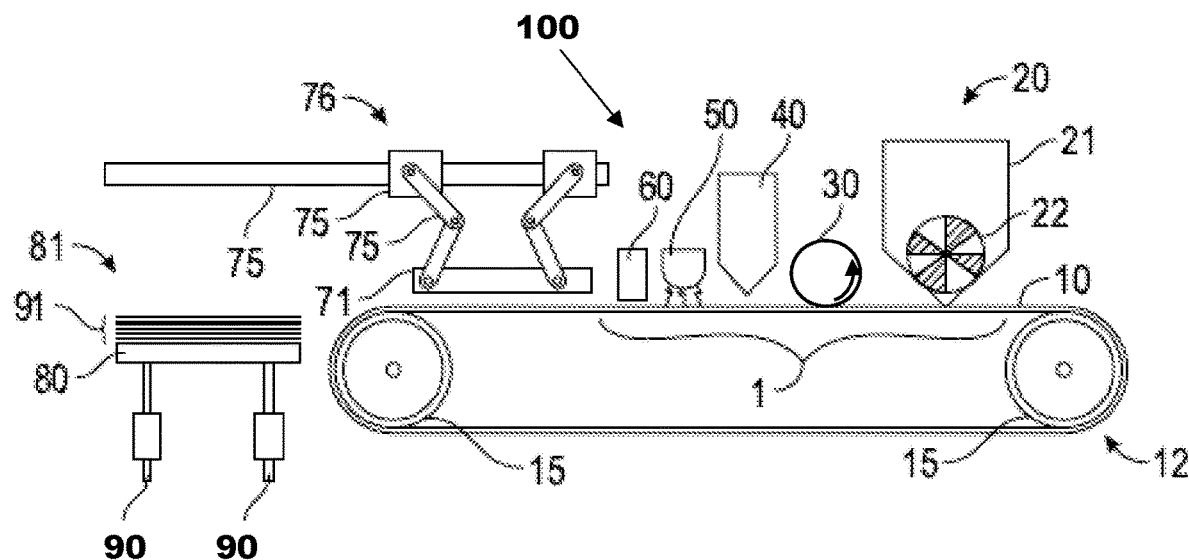
FIG. 1 illustrates a schematic representation of a typical 3D printing apparatus including a print station and a continuous substrate.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Current 3D printing systems present a technical problem because blades used to render the deposited powder uniform over a substrate may generate sheer forces that may prevent or hinder the printing of thin layers of powder, e.g., in the range of 100 μm. Furthermore, rollers used to compact the deposited powders also introduce sheer forces that may prevent or hinder the uniform printing of thin layers of powder. This problem also applies to powder deposited in a powder bed. Accordingly, in the following description, the term "substrate" may include a layer being provided by a powder bed.

To address these technical problems and more, in an example, this description provides a technical solution allowing for uniform powder deposition by using a powder feeder configured as an adjustable blade in conjunction with a counter-rotating roller positioned at a desired distance from the powder feeder. To further address the above technical problems, in another example, this description provides another technical solution independently adjusting the gap between the powder feeder and the surface of the substrate, and the gap between the counter-rotating roller and the surface of the substrate.

Various implementations include a print station of a three-dimensional ("3D") printing apparatus, and method of 3D printing, the print station including a substrate configured to hold a printed object, the substrate having a longitudinal axis, and a print system over the substrate, the print system including a powder feeder device having a blade-shaped end, and a powder uniformization device located at a distance from the powder feeder device along a direction parallel to the longitudinal axis.

Various implementations include a powder deposition arrangement configured to facilitate uniform powder deposition of thin layers, where the powder is fed by a powder feeder that includes an adjustable blade, and the powder deposition arrangement also includes a counter-rotating roller located at a given distance from the powder feeder and used to compact the powder material during the process of 3D printing. In addition, the gap between the powder feeder and the substrate (feeder gap) may be adjustable to increase the quality of the powder deposition. The gap between the powder feeder and the surface of the substrate defines the quality of the deposition by, e.g., minimizing the compaction of the powder. As another example, the gap between the counter-rotating roller and the substrate (roller gap) is also adjustable to a desired value in order to control the printed thickness as well as quality of the thin layer deposition during the process of 3D printing, the roller gap being independently adjustable from the feeder gap. For example, the roller gap may define the final thickness of the printed layer, while, as discussed above, the powder feeder gap may define the quality of the deposition.

FIG. 1 schematically depicts a print station 100 and an assembly apparatus 81 with a continuous substrate. In embodiments, a print station 100 includes a printing system 1 and a substrate 10. As will be discussed below, the printing system 1 includes a dispensing device 20, a compaction device 30, a binder printing device 40, a fixing device 50 and a fluidized materials removal device 60. As shown in FIG. 1, the print station 100 can include a carrier device 12. In some implementations, the carrier device 12 can include a conveyor configured to transport or move materials from a first position to a second position. The conveyor can include a belt and two rotating elements 15, configured to rotate in the same direction to advance the belt in a certain direction. The carrier device 12 can have a distal end and a proximal end. The carrier device 12 can transport a substrate 10 from the distal end to the proximal end. The substrate 10 can be positioned by the two rotating elements 15 to a location where a transfer device 76 can transport a printed layer (not shown) to a build substrate 80 in the assembly apparatus 81.

At the distal end of the carrier device 12, a dispensing device 20 can be provided. The dispensing device 20 can simply be a dispenser configured to dispense fluidized material, e.g., a flowable powder. The dispensing device 20 can include a materials storage 21 and a dispensing controller 22. The dispensing controller 22 can be configured to meter an amount of fluidized material deposited onto the substrate 10. The dispensing controller 22 can also be configured to precisely control the uniformity of the deposited fluidized material.

Near the distal end of the carrier device 12, a compaction device 30 can be provided. In some implementations, the compaction device 30 can include a roller, made up of a hardened metal material designed as a cylindrical tube. In some implementations, the compaction device 30 can be configured to compact a fluidized material to a high density of at least 40% of the theoretical density of the fluidized material. The compaction device 30 rotates in the direction opposing the direction of powder distribution from right to left, i.e., in a counter-clockwise direction opposing the spreading direction of the deposited powder layer when the substrate 10 moves from right to left while the dispensing device 20 and the compaction device 30 are static or not movable, as illustrated in FIG. 1.

Near the distal end of the carrier device 12, a binder printing device 40 can be provided. The binder printing device 40 can be configured to deposit a liquid binding material to fix a precise pattern into the fluidized material. The precise pattern can be fixed into the fluidized material by binding the fluidized material into a connected and robust mass. In some implementations, the binder printing device 40 can be an ink jet type print head under direct control of a computer (not shown).

Near the center of the carrier device 12, a fixing device 50 can be provided. The fixing device 50 can be configured to solidify the liquid binding material, thus fixing the fluidized material exposed to the liquid binding material in a robust solid pattern. The fixing device 50 can be a source of radiant energy that may interact with the liquid binding material to cause it to become solid. In some implementations, the radiant energy can be IR radiation, UV radiation, electron beam, or other known radiation types. It should be understood the fixing device 50 does not need to be limited to the disclosed radiation types, as this list is presented for exemplary implementations and not intended to be exhaustive. Alternatively, the fixing device 50 can include a device for dispersing a reactive agent configured to react with the liquid binding material and the fluidized material to convert the fluidized material to a robust mass.

A fluidized materials removal device 60 can be provided downstream from the fixing device 50. The fluidized materials removal device 60 can be configured to remove all of the fluidized material deposited and compacted onto the substrate 10. The fluidized materials removal device 60 can remove the fluidized material deposited and compacted onto the substrate, but not fixed in place by the liquid binder material.

A transfer device 76 can be implemented downstream from the fluidized materials removal device 60 in the assembly apparatus 81. The transfer device 76 can be configured to move a printed layer (not shown) from the substrate 10. The printed layer can be moved from the substrate 10 to a build substrate 80, or to the top of a stack of previously positioned layers 91. The transfer device 76 can also include a pick-up assembly. The pick-up assembly can include an attachment device 71 configured to remove a printed layer from the substrate 10. The attachment device 71 can include a vacuum device or an adhesive device to overcome the force holding the printed layer to the substrate 10. The transfer device 76 may also include a translation device 75 configured to move the printed layer from the substrate 10 to the assembly apparatus 81.

The elevator device 90 is configured to maintain the level of the top of the stack of previously positioned layers 91. In an implementation, the elevator device 90 can include a linear motor device.

Figure 2:
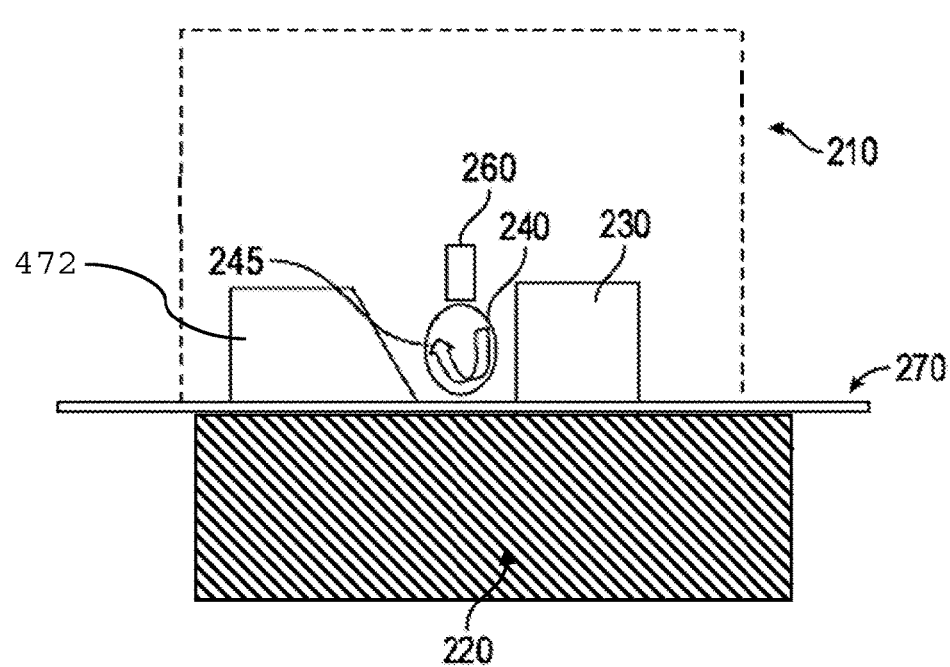
FIG. 2 illustrates a schematic representation of a print station in accordance with various example implementations.

FIG. 2 illustrates a schematic representation of a print station with a continuous substrate for depositing thin layers of powder on a substrate, in accordance with various example implementations. With reference to FIG. 1, the printing system 210 may correspond to, e.g., the combination of the dispensing device 20 and the compaction device 30. In FIG. 2, the print station 200 includes a support 220 corresponding to the carrier device 12 and a printing system 210. The printing system 210 may be movable while the support 220 may be fixed, or the printing system 210 may be fixed while the support 220 is movable. The printing system 210 may include a top support 230, an adjustable roller 240 configured to decrease or minimize non-uniform deposition, and a powder feeder 250. The printing system 210 may also include a roller cleaner 260 to clean the roller 240 of any residual powder that may remain thereon and that may contaminate the roller 240.

In operation, the powder is provided by the powder feeder 250 while the printing system 210 is moving from right to left relatively to the support 220 which remains stationary, or the support 220 is moving from left to right relatively to the printing system 210 which remains stationary. Accordingly, when the powder is provided by the powder feeder 250, the powder is subsequently submitted to the rotating action of the roller 240. For example, the roller 240 is a counter-rotating roller, i.e., the roller 240 rotates in a direction 245 that is opposite to a direction of the movement of powder feeder 250 or the direction of the spreading of the deposited powder layer. The roller 240 agitates the powder after the powder is deposited on the substrate 270. Accordingly, the powder that is provided by the powder feeder 250 is uniformized by the action of the roller 240.

The roller 240 also applies a pressure to the powder after the powder is deposited on the substrate 270. Accordingly, the powder that is provided by the powder feeder 250 is uniformized by the action of the roller 240. The roller 240 may be installed with an adjustable angle so that the accumulated powder may be released behind the roller.

Figure 3A:
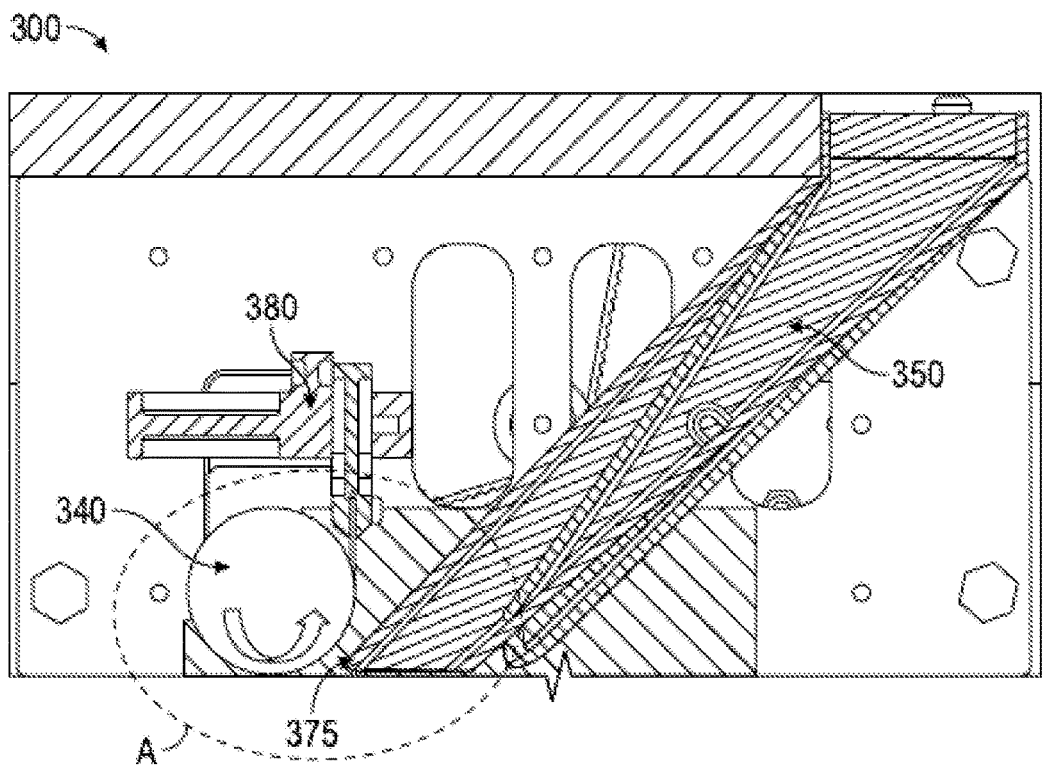
FIG. 3A illustrates a portion of a print station including a powder feeder and a counter-rotating roller, in accordance with various example implementations.

FIG. 3A illustrates a portion of a print system 300 including a powder feeder 350 and a counter-rotating roller 340, in accordance with various example implementations. With reference to FIG. 1, the print system 300 may correspond to, e.g., the combination of the dispensing device 20 and the compaction device 30. Further, a print station may include the print system 300 and the substrate 370. In various implementations, the print system 300 includes a powder feeder 350, and the powder feeder 350 has a blade 375 integrated or included therein, so that when the powder exits the powder feeder 350 at the blade 375 located at the exit point of the powder feeder 350, the powder is flattened and at least partially uniformized by the blade 375. FIG. 3C provides an illustration of the blade 375. For example, the blade 375 ensures that the thickness of the powder that is deposited by the powder feeder 350 remains substantially the same. In addition, for example, a counter-rotating roller 340 is positioned at a given distance from the blade 375, the counter-rotating roller 340 further planarizing and uniformizing the powder that exits the powder feeder 350 at the blade 375. For example, the counter-rotating roller 340 may enable a uniform deposition of less flowable powders. The blade 375 may ensure that the thickness of the powder that is deposited by the powder feeder 350 remains substantially the same as it approaches the counter-rotating roller 340. As a result, powder accumulation in front of the counter-rotating roller 340 may be avoided or reduced.

The powder feeder 350 may also ensure the ability to maintain and/or reduce the sheer forces applied to the printed powder during powder deposition, and may thus allow the printing of thin layers, e.g., in the range of 100 μm, on a substrate 370. The powder feeder 350, which includes the blade 375, may have an adjustment arrangement configured to adjust the gap between the powder feeder 350/blade 375 and a surface of the substrate 370. The counter-rotating roller 340 may also independently have an adjustment arrangement configured to adjust the gap between the counter-rotating roller 340 and the surface of the substrate 370.

In various implementations, the print system 300 may further include a roller cleaner 380 configured to clean the counter-rotating roller 340. For example, the roller cleaner 380 can remove unwanted powder particles that may remain on the counter-rotating roller 340 after the counter-rotating roller 340 distributed the powder. In addition, as the print system 300 may be movable with respect to the underlying substrate such as, e.g., substrate 10 illustrated in FIG. 1, the blade 375 is also movable with respect to the substrate. In other examples, the substrate is movable with respect to the print system 300, and thus movable with respect to the blade 375.

In various implementations, the counter-rotating roller 340 rotates at a speed in the range of 10 RPM to 300 RPM. If the counter-rotating roller 340 has a rotating speed that is greater or lower than this range, then the resulting quality of the powder deposition may be deteriorated because the uniformity of the deposited powder may be affected by the counter-rotating roller.

In various implementations, a lubricant agent and/or a wetting agent is added to the powder being distributed by the powder feeder 350 in order to, e.g., increase the flowability of the powder that is deposited in front of the counter-rotating roller 340. Adding such lubricant agent and/or a wetting agent may improve the compaction of the powder and minimize or control the tension between the substrate and the compacted powder layer. Specifically, the lubricating agent facilitates obtaining a uniform compaction of the powder that is compacted by the counter-rotating roller 340. In implementations, the print system 300 may include a single counter-rotating roller 340, and may avoid having to have an additional compacting roller that rotates in the same direction of the spreading of the deposited powder, i.e., rotates in the opposite direction to the rotation direction of a counter-rotating roller 340. Example lubricating agents and wetting agents include water and isopropyl alcohol.

Figure 3B:
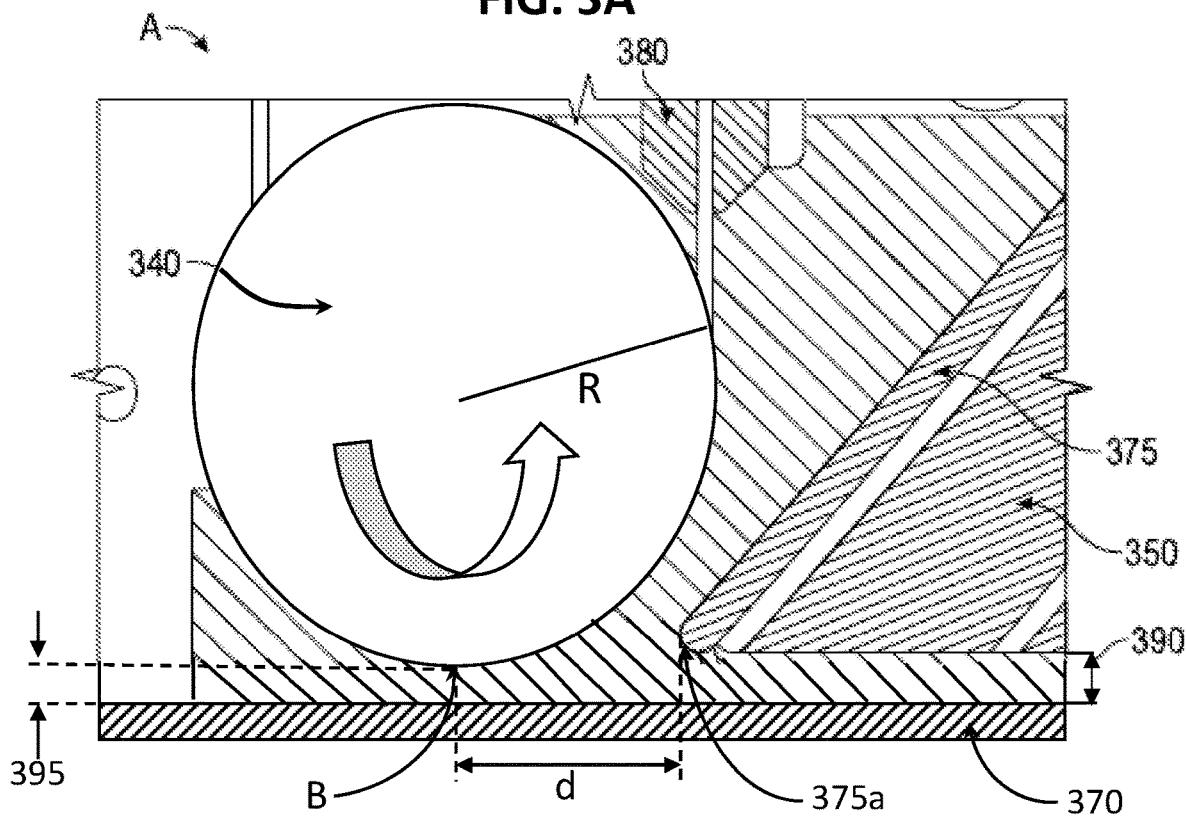
FIG. 3B illustrates a detailed portion of the print station illustrated in FIG. 3A, in accordance with various example implementations.
Figure 3C:
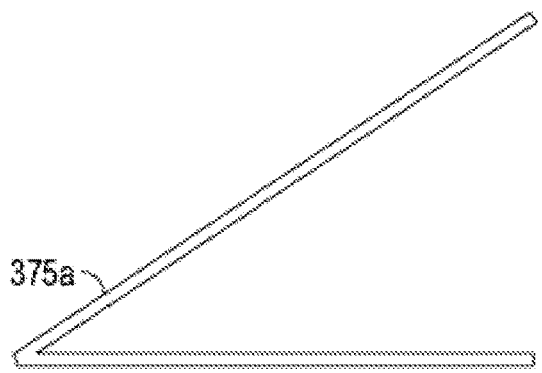
FIG. 3C illustrates a blade, in accordance with various example implementations.

FIG. 3B illustrates a detailed portion of the print station illustrated in FIG. 3A, in accordance with various example implementations. In various implementations, the portion referred to as "A" in FIG. 3A is discussed in greater detail below. In FIG. 3B, the counter-rotating roller 340 has a radius R, and a distance "d" between a lowest contact point of the counter-rotating roller 340 to the substrate 370, with the lowest contact point being labeled as "B," and the end point of the blade, labeled as 375a. This distance "d" may be in a range of one to two R, for example. 1.5R. In a particular example, the distance "d" may be equal to about R. If the distance "d" is much greater than R, then the powder may undergo rotation in front of the counter-rotating roller 340, which results in a poor powder deposition such as, e.g., non-uniform deposition.

In various implementations, a feeder gap 390 between the lowest portion of the powder feeder 350 and the surface of the substrate 370 may be adjustable as desired. Accordingly, the feeder gap 390 between the substrate and the powder feeder 350, or between the previously deposited powder layer and the powder feeder 350 may be maintained at a desired constant, or substantially constant value to ensure uniform thickness of the deposited powder layer. For example, in order to deposit a single layer of powder, the feeder gap 390 between the substrate 370 and the powder feeder 350 may be adjusted accordingly. The feeder gap 390 between the surface of the substrate 370 and the lowest portion of the powder feeder 350 defines the quality of the deposition. In other implementations, the feeder gap 390 may be defined between the lowest portion of the blade 375 and the surface of the substrate 370, or the surface of a previously deposited powder layer.

In some implementations, the counter-rotating roller 340 may also have an adjustable roller gap 395 between the lowermost surface thereof and the substrate 370. In embodiments, the roller gap 395 being independently adjustable from the feeder gap 390. In addition, the roller gap 395 defines a final thickness of the printed layer, while, as discussed above, the feeder gap 390 defines the quality of the deposition. In embodiments, the feeder gap 390 may be greater than the roller gap 395. For example, the feeder gap 390 is greater than the roller gap 395 and equal to or lower than one-half of the diameter of the counter-rotating roller 340. If the feeder gap 390 is greater than one-half of the diameter of the counter-rotating roller 340, then the powder may undergo rotation in front of the counter-rotating roller 340, which results in a poor powder deposition such as, e.g., non-uniform deposition.

Figure 3D:
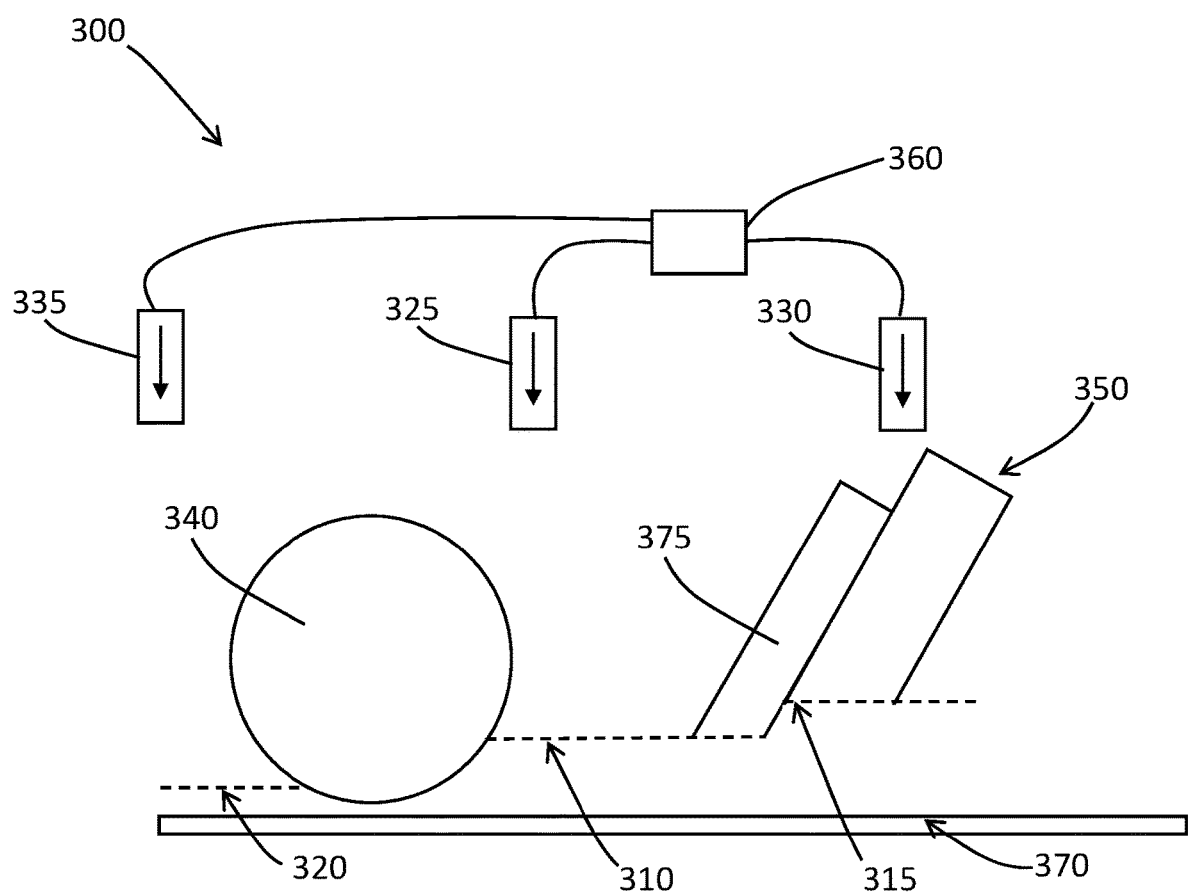
FIG. 3D illustrates a schematic representation of a print station in accordance with various example implementations.

In some implementations, as illustrated by FIG. 3D, the print system 300 includes the counter-rotating roller 340, the powder feeder 350 with blade 375, one or more sensors 325, 330, 335, and a control apparatus 360. The one or more sensors 325, 330, 335 may comprise point, multi-point or continuous level devices for sensing one or more parameters of a thickness of a powder level, a powder level, or a surface profile or topography of the powder deposited by the powder feeder 350, amongst other parameters. As an example, the one or more sensors 325, 330, 335 include an ultrasonic thickness sensor, or an optical sensor (such as a laser sensor), though a person of skill in the art will recognize that other forms of thickness or topographic sensors can alternatively be used to measure parameters with respect to the powder deposited by the powder feeder 350. In a particular example, sensors 325 and 330 are located upstream from the counter-rotating roller 340, and additional sensor 335 is located downstream from the counter-rotating roller 340. The one or more sensors 325, 330, 335 are connected to the control apparatus 360.

For the purposes of explanation, FIG. 3D also indicates illustrative thickness levels of the powder deposited by the powder feeder 350 at various stages throughout operation of the print system 300 in a 3D printing apparatus, in accordance with an example implementation. With reference to FIG. 3D, the dashed line 315 represents a level of powder after it has been deposited by the powder feeder 350, prior to encountering the blade 375. The dashed line 310 represents a powder surface level, or thickness 310 after the powder has been at least partially uniformized by the blade 375, prior to encountering the counter-rotating roller 340. Powder surface level 320 is a surface level or thickness of the powder after the powder has been further planarized and uniformized by the counter-rotating roller 340, as shown as dashed line 320.

In order for an optimum operation of the counter-rotating roller 340, and to reduce an accumulation of powder in front of the counter-rotating roller 340 and achieve uniform compacting of the powder, in one implementation, sensor 325 may be utilized to acquire a first powder surface height measurement of the powder surface level 310, at one or more locations between the blade-shaped end of the powder feeder 350 and the counter-rotating roller 340, for example, just before the counter-rotating roller 340. The measurement data acquired from sensor 325 may be conveyed to the control apparatus 360, in which a processing unit (not shown) compares the acquired data of the powder surface level 310 to a first predetermined powder surface height threshold value stored in a memory of the control apparatus 360. The first predetermined powder surface height threshold value is a maximum height at which the powder deposited by the powder feeder 350 should be allowed to accumulate. Above the first predetermined powder surface height threshold value, powder accumulation in front of the counter-rotating roller 340 would create conditions resulting in the powder not being able to rotate under the counter-rotating roller 340, and increasing the potential of a non-uniform powder layer being created.

Should the processing unit determine that the first powder surface height measurement of the powder surface level 310 is above the first predetermined powder surface height threshold value (also referred to as the predetermined threshold value), the control apparatus 360, via a control unit for the blade 375, adjusts the height of the blade 375 above the substrate 370, reducing it such that less powder is allowed to approach the counter-rotating roller 340. The amount of adjustment may be determined by the processing unit based on a data table or similar predetermined data, amongst other examples. In some implementations, adjusting the height of the blade 375 above the substrate 370 may comprise lowering the blade 375 such that substantially no further powder is allowed to approach the counter-rotating roller 340.

In some implementations, alternatively, or additionally, an amount of powder distributed by the powder feeder 350 may be adjusted. In one example, sensor 330 may be utilized to acquire a second powder surface height measurement of the powder surface level 315, at one or more locations before the powder encounters the blade 375. The measurement data acquired from sensor 330 may be conveyed to control apparatus 360, in which a processing unit (not shown) compares the acquired data to a second predetermined powder surface height threshold value (also referred to as the predetermined threshold value), stored in a memory of the control apparatus 360. The second predetermined powder surface height threshold value is a maximum height at which the powder should be allowed to accumulate before the blade 375.

Should the processing unit determine that the second powder surface height measurement of the powder surface level 315 is above the second predetermined powder surface height threshold value, the control apparatus 360, via a control unit (not shown) for the powder feeder 350, adjusts the amount of powder dispensed, reducing it such that less powder is dispensed before approaching the blade 375. In one example, the control unit may communicate with the dispensing controller 22 (see FIG. 1) to adjust the amount of fluidized material metered. The amount of adjustment may be determined by the processing unit based on a data table or similar predetermined data, amongst other examples. In some implementations, adjusting the powder dispensed by the powder feeder 350 may include closing an output of the powder feeder 350 such that substantially no further powder is dispensed.

In other implementations, alternatively, or additionally, additional sensor 335 may be utilized to acquire a third powder surface height measurement of the powder surface level 320, at one or more locations after passing under the counter-rotating roller 340, or downstream from the counter-rotating roller 340. The measurement data acquired from additional sensor 335 may be conveyed to control apparatus 360, in which a processing unit (not shown) compares the acquired data to a desired powder surface height value, or desired range of values, stored in a memory of the control apparatus 360. Should the processing unit determine that the third powder surface height measurement of the powder surface level 320 deviate from a desired value or range of values of the desired powder surface level, or a predetermined target value, the control apparatus 360, via a control unit or an additional control apparatus (not shown) for the counter-rotating roller 340, adjusts the height of the lowest contact point of the counter-rotating roller 340 to the substrate 370. The amount of adjustment may be determined by the processing unit based on a data table or similar predetermined data, amongst other examples. In some implementations, in addition or alternatively to adjusting the height of the lowest contact point of the counter-rotating roller 340 to the substrate 370, the amount of powder that passes under the blade 375 may also be adjusted.

In some implementations, one or more of the sensors 325, 330, 335 continually monitor powder thickness, powder level or topographical data in real-time, and adjust the one or more of the heights of the counter-rotating roller 340 and/or the height of the blade 375 above the substrate, and/or the amount of powder dispensed by the powder dispenser 350. In other implementations, the control apparatus 360 may be configured to enable one or more feedback operations between one or more of the sensors 325, 330, 335, and control units associated with the powder feeder 350, blade 375 and counter-rotating roller 340. In this manner, the feedback, in association with control algorithms can be utilized to provide dynamic adjustment to maintain consistency in the powder uniformization process of a 3D printing operation.

The control apparatus 360 may comprise software architecture, various portions of which may be used in conjunction with various hardware elements described herein. It will be appreciated that the software architecture may be implemented to facilitate the functionality described herein. The software architecture may be executed on hardware such as a central processing unit that may include, among other things, document storage, processors, memory/storage, and input/output (I/O) components. The architecture may include a processing unit and associated executable instructions. The executable instructions may include implementation of the methods, modules and so forth described herein. The architecture may also include other hardware modules. Drivers may be responsible for controlling or interfacing with the underlying hardware. Drivers may include display drivers, camera drivers, memory/storage drivers, peripheral device drivers, network and/or wireless communication drivers, audio drivers, and so forth depending on the hardware and/or software configuration. Libraries, including data libraries may provide a common infrastructure that may be used by applications and/or other components.

In various implementations, the counter-rotating roller 340 may be coated by a coating (not shown). For example, the coating may be an anodized coating, a Teflon coating, or a plastic coating. A plastic coating may minimize the friction between the powder and the counter-rotating roller 340, and may also minimize powder sticking or adhering on the counter-rotating roller 340. For example, during operation of the print system 300, the powder that is distributed by the powder feeder 350 and compacted by the counter-rotating roller 340 may adhere to the surface of the counter-rotating roller 340. The powder adhered on the counter-rotating roller 340 may impact the quality of subsequent layers of the 3D printed product. A plastic coating on the counter-rotating roller 340 may decrease such powder sticking. Similarly, an anodized coating to the counter-rotating roller 340 may provide a decreased powder sticking, and may also reduce friction between the surface of the counter-rotating roller 340 and the substrate 370. As an example, the coating may reduce electrostatic charging of the powder during operation of the print system 300. As another example, a thickness of the coating is in a range of 0.1 nm to 500 μm.

Figure 4A:
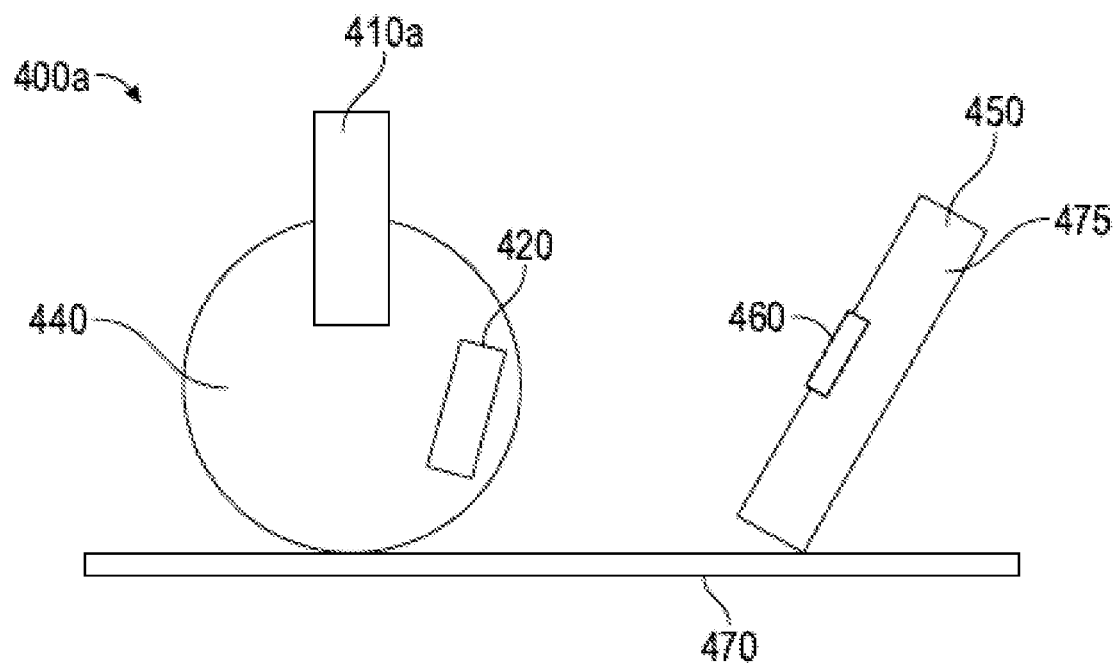
FIGS. 4A-4B illustrate schematic representations of a print station in accordance with various example implementations.
Figure 4B:
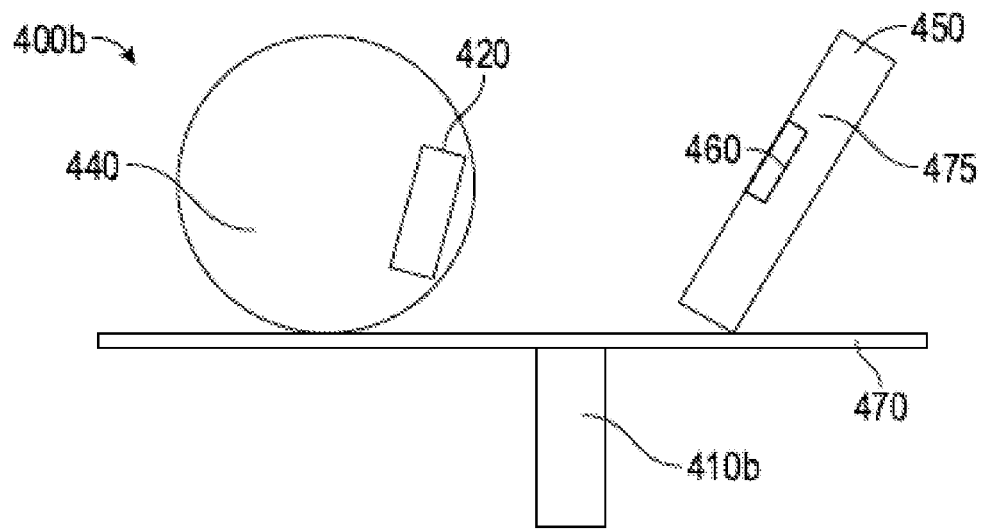

FIGS. 4A-4B illustrate schematic representations of a print station in accordance with various example implementations. In FIG. 4A, the print station 400*a* includes roller 440, powder feeder 450 comprising blade 475, and substrate 470. With reference to FIG. 3A, roller 440 may correspond to roller 340, and powder feeder 450/blade 475 may correspond to powder feeder 350/blade 375, and substrate 470 may correspond to substrate 370. In FIG. 4A, the print station 400*a* further includes a vibrating device 410*a*. For example, the vibrating device 410*a* is functionally connected, e.g., integrally connected, to the roller 440, and may be configured to vibrate at a rapid frequency in order to make the roller 440 vibrate at the rapid frequency. For example, the vibrating device 410*a* may vibrate at, e.g., an ultrasonic frequency and thus makes the roller 440 vibrate at the ultrasonic frequency. As a result of the roller 440 vibrating at a rapid frequency, e.g., at an ultrasonic frequency, the powder that is in contact with the roller 440 during the counter-rotation of the roller 440 may be better distributed, and agglomeration of the powder at the point of contact with the roller 440, or in the vicinity of the point of contact with the roller 440, may be reduced, significantly reduced, or eliminated.

In FIG. 4B, the print station 400*b* includes roller 440, powder feeder 450 that includes blade 475, and substrate 470. With reference to FIG. 3A, roller 440 may correspond to roller 340, powder feeder 450 may correspond to powder feeder 350, and blade 475 may correspond to blade 375, and substrate 470 may correspond to substrate 370. In FIG. 4B, the print station 400*b* further includes a vibrating device 410*b*. For example, the vibrating device 410*b* is functionally connected, e.g., integrally connected, to the substrate 470, and may be configured to vibrate at a rapid frequency in order to make the substrate 470 vibrate at the rapid frequency. For example, the vibrating device 410*b* may vibrate at, e.g., an ultrasonic frequency and thus makes the substrate 470 vibrate at the ultrasonic frequency. As a result of the substrate 470 vibrating at a rapid frequency, e.g., at an ultrasonic frequency, the powder that is deposited by the powder feeder 450 on the substrate 470 may be better distributed on the substrate 470, and agglomeration of the powder at the point of contact with the roller 440, or in the vicinity of the point of contact with the roller 440, may be reduced, significantly reduced, or eliminated. In various implementations, the print station 400*a*/400*b* may include both vibrating devices 410*a* and 410*b*, in which case both the roller 440 and the substrate 470 are made to vibrate at the rapid frequency during deposition and distribution of the powder.

In various implementations, the powder feeder 450 may enclose therein one or more devices or elements 460 designed to control or influence the environment where the powder is stored before being distributed. For example, the devices or elements 460 may be any combination of a dehumidifier, one or more heating elements, and an inert gas provider configured to provide an inert gas inside the powder feeder 450. Any one of these devices or elements 460, whether alone or in combination, may be enclosed in the powder feeder 450 in order to ensure that the powder remains sufficiently dry and un-agglomerated, and thus to ensure a sufficient quality of the resulting printed layer.

In various implementations, the counter-rotating roller 440 may include an electric charging mechanism 420 that delivers an electric charge to the surface of the counter-rotating roller 440 to remove any powder that may adhere to the surface of the counter-rotating roller 440 via static charging. Alternatively, the electric charge delivered to the surface of the counter-rotating roller 440 by the electric charging mechanism 420 may prevent the powder from adhering to the surface of the counter-rotating roller 440 via static charging.

Figure 5:
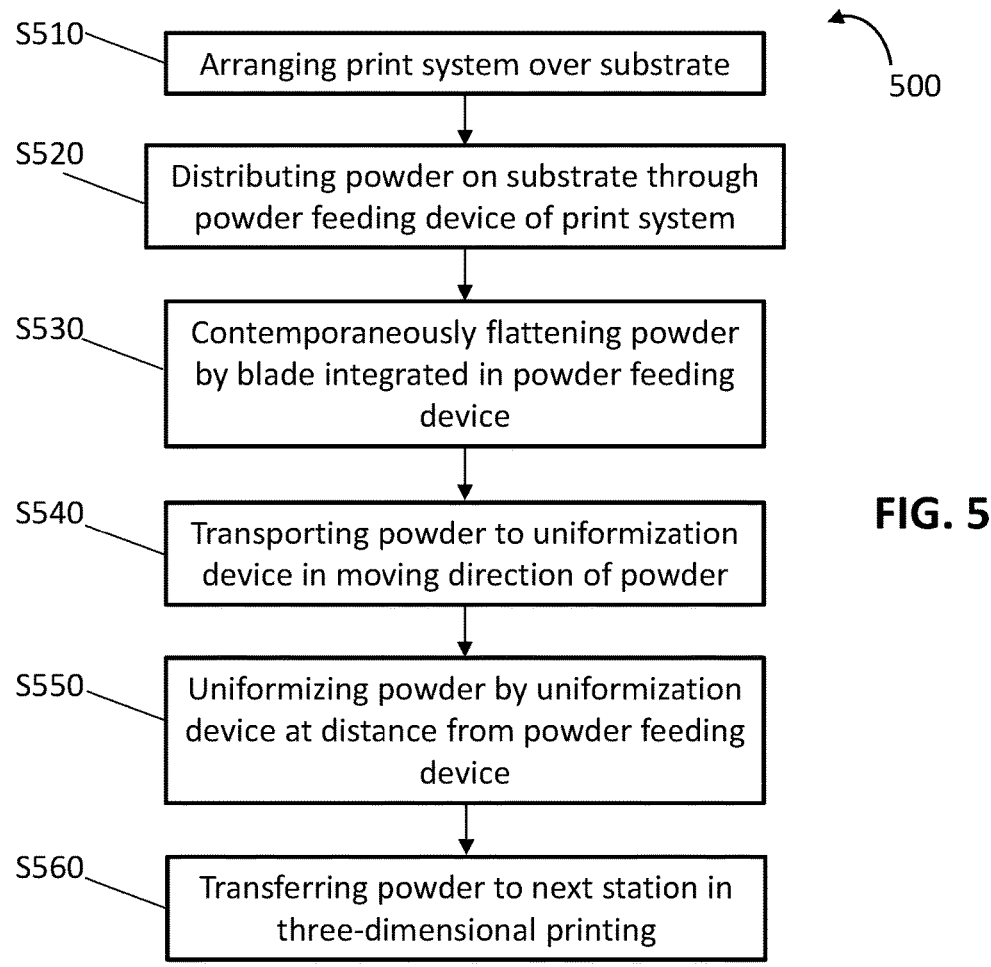
FIG. 5 illustrates a method of operation of a 3D print station in accordance with various example implementations.

FIG. 5 illustrates a method of operation of a print station in a 3D printing apparatus, in accordance with various example implementations. In the process 500 of FIG. 5, at S510, a print system is arranged over a substrate, the substrate having a longitudinal axis. With reference to FIG. 2, the printing system 210 is arranged over the substrate 270 or the support 220. The process 500 continues to S520, where a powder is distributed on the substrate through a powder feeding device of the print system. For example, the powder is distributed on the powder bed of a print station that is part of a 3D printing apparatus. With reference to FIGS. 3A and 3B, the powder is distributed from the powder feeder 350. In implementations, a lubricating agent and/or a wetting agent may be added to the powder that is distributed at S520, the lubricating agent and/or wetting agent being configured to increase the flowability of the powder and the compaction uniformity. By controlling the surface tension of the powder, the lubricating agent and/or wetting agent may also prevent or reduce powder sticking to the roller.

In various implementations, as the powder is distributed at S520, the process 500 continues to S530 by contemporaneously or simultaneously flattening the distributed powder via, e.g., a blade integrated into the powder feeding device. For example, the flattening at S530 may maintain a constant thickness of the powder distributed on the substrate. With reference to FIGS. 3A and 3B, as the powder is distributed via the powder feeder 350, the powder is contemporaneously flattened by the blade 375. The process 500 continues to S540 where the powder is transported to a uniformization device along a moving direction of the powder, the moving direction being parallel to the longitudinal axis of the substrate. For example, the uniformization device may be a roller located at a desired distance from the blade 375, the roller being configured to apply a pressure on the powder. The process 500 continues to S550 where the powder is uniformized by the uniformization device. With reference to FIGS. 3A and 3B, the powder is uniformized by the counter-rotating roller 340 which rotates and applies pressure on the powder. In implementations, the counter-rotating roller 340 rotates in a direction opposing the moving direction of the powder or the direction of the spreading of the deposited powder on the substrate. The process 500 continues to S560, where the powder is transferred to the next station in the 3D printing process such as, e.g., binder printing in a printing device, fixing in a fixing device, or transferred to a transfer device. With reference to FIG. 1, the powder may be transferred to the binder printing device 40, the fixing device 50, or the transfer device 76.

Figure 6:
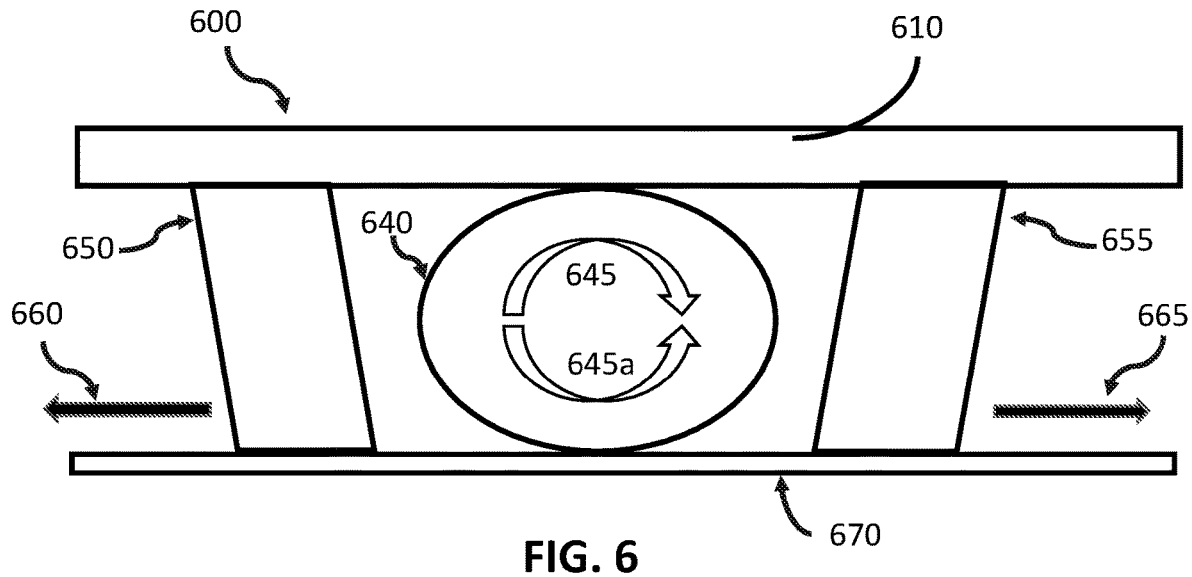
FIG. 6 illustrates a schematic representation of a print system in accordance with various example implementations.

FIG. 6 illustrates a schematic representation of print system 600, in accordance with various example implementations described with respect to FIGS. 1-5. With reference to FIGS. 1-5, print system 600 includes a plurality of powder feeders 650, 655. The powder feeders 650, 655, may dispense the same powder as each other, or different powders, allowing for multi-material deposition. Further, FIG. 6 illustrates each powder feeder of the powder feeders 650, 655 is attached to a support or mounting apparatus 610. In some embodiments, each powder feeder of the powder feeders 650, 655, is located along a longitudinal axis of the print system 600, a longitudinal axis of the support or mounting apparatus 610, and/or a longitudinal axis of the substrate 670. The print system 600 may include one or more powder uniformization devices 640, which may be attached to the same support or mounting apparatus 610 to move together with the powder feeders 650 and 655. Alternatively, the powder uniformization device 640 may be attached to a support or mounting apparatus different from support or mounting apparatus 610 to move independently with the powder feeders 650, 655. In some embodiments, support or mounting apparatus 610 is configured to control movement of the powder feeders 650, 655 and powder uniformization device 640, via a controller (not shown), either from right to left, or from left to right along the longitudinal axis formed by the support or mounting apparatus 610, in order to deposit powder on the substrate 670. Alternatively, or additionally, the support or mounting apparatus 610 is configured to control the movement of the powder feeders 650, 655 and powder uniformization device 640 in a direction, substantially perpendicular to the longitudinal axis form by the support or mounting apparatus 610 in order to deposit powder on the substrate 670. In some embodiments, one of the support or mounting apparatus 610 and the substrate 670 is configured to move in first and second directions, wherein the first direction may be opposed to the second direction, substantially parallel to the longitudinal direction, while the other of the support or mounting apparatus 610 and the substrate 670 remains stationary. In some implementations, the support or mounting apparatus 610, the powder feeders 650, 655, and the powder uniformization device 640 are movable together. Alternatively, the support or mounting apparatus 610 is static while the powder feeders 650, 655 and the powder uniformization device 640 are movable. In some embodiments, the print system 600 may be movable with respect to the substrate 670 along the longitudinal axis formed by the substrate 670, and the substrate 670 may remain stationary with respect to the longitudinal axis. In other embodiments, the substrate 670 may be movable with respect to the print system 600 along the longitudinal axis formed by the substrate 670, and the print system 600 may remain stationary with respect to the longitudinal axis. Alternatively, both the print system 600 and the substrate 670 may be movable with respect to each other along the longitudinal axis.

In some embodiments, the print system 600 may further comprise a carrier device, as illustrated in FIG. 1 (which may include a conveyor) to transport the substrate 670 from a first location to a second location.

In some embodiments, the powder feeders 650, 655, may correspond to powder feeders 350, 450, and may include all of their features as described with respect to FIGS. 3A, 3B, 4A, and 4B, including each powder feeder of the powder feeders 650, 655, having a blade-shaped end. In some embodiments, each blade-shaped end has a lower surface substantially parallel to the substrate 670. In further embodiments, a distance between a lowest contact point of the powder uniformization device 640 to the substrate 670 and an end point of each blade of each powder feeder of the powder feeders 650, 655, is equal to about one radius of the roller of the powder uniformization device 640. As a further example, the powder feeders 650, 655, may each enclose one or more devices or elements designed to control or influence the environment where the powder is stored before being distributed by any one of the powder feeders 650, 655. As a further example, the devices or elements may be any combination of a dehumidifier, one or more heating elements, and an inert gas provider configured to provide an inert gas inside the powder feeders 650, 655. Any one of these devices or elements may be enclosed in any one of the powder feeders 650, 655, in order to ensure that the powder remains sufficiently dry and un-agglomerated, and thus to ensure a sufficient quality of the resulting printed layer.

As shown in FIG. 6, the print system 600 includes a uniformization device, i.e., powder uniformization device 640, located adjacent at least one powder feeder of the plurality of powder feeders 650, 655. For example between the plurality of powder feeders 650, 655. The powder uniformization device 640 uniformizes powder deposited by the powder feeders 650, 655 onto the substrate 670. In some embodiments, the powder uniformization device 640 may include a roller which corresponds to rollers 340, 440, and may include all of their features as described with respect to FIGS. 3A, 3B, 4A, and 4B.

In some embodiments, the powder feeders 650, 655 may contain different powder materials, and the powder uniformization device 640 may comprise two or more powder uniformization devices (not shown). The implementation of two or more powder uniformization devices ensures that there is no powder cross contamination. For example, in the case where powder feeder 650 dispenses a first powder material, and powder feeder 655 dispenses a second powder material, powder uniformization device 640 may comprise two independent powder uniformization devices 640*a* and 640*b* (not shown). With powder uniformization device 640*a* operated to uniformize powder deposited by the powder feeder 650, and powder uniformization device 640*b* operated to uniformize powder deposited by the powder feeder 655.

In further embodiments, the print system 600 may include a vibrating device (not shown) connected to a roller of the powder uniformization device 640, similar to vibrating device 410*a* functionally connected to the roller 440. Further, the print system 600 may include a vibrating device (not shown) connected to the substrate 670, similar to the vibrating device 410*b* functionally connected to the substrate 470. In embodiments, these vibrating devices of the print system 600 are configured to vibrate at a rapid frequency in order to make the roller of the powder uniformization device 640 or the substrate 670 vibrate at the rapid frequency, similar to vibrating devices 410*a*, 410*b* referenced in FIGS. 4A and 4B. For example, a vibrating device of the print system 600 may vibrate at, e.g., an ultrasonic frequency, thereby making the roller of the powder uniformization device 640 vibrate at the ultrasonic frequency. As a result of the roller of the powder uniformization device 640 or substrate 670 vibrating at a rapid frequency, e.g., at an ultrasonic frequency, the powder that is in contact with the roller of the powder uniformization device 640 may be better distributed. Further, an agglomeration of the powder at the point of contact with the roller of the powder uniformization device 640, or in the vicinity of the point of contact with the roller of the powder uniformization device 640, may be reduced, significantly reduced, or eliminated.

Generally, powder deposition by a powder feeder occurs in only one direction. For example, when printing a structure over a stationary build platform, a powder feeder may travel from right to left depositing a first layer of powder. In this example, the powder feeder then travels back from left to right without depositing powder to an original location of the powder feeder. The powder feeder then travels from right to left depositing a second layer of powder. Such a printing system is relatively inefficient since an amount of time for the powder feeder to travel back from left to right is wasted.

As shown in FIG. 6, the print system 600 addresses the issue of wasteful movement by providing powder feeders 650, 655, which are movable along various directions 660, 665. In this way, the powder feeders 650, 655 allow for the deposition of a powder onto the substrate 670 along each of these directions 660, 665, thereby eliminating the wasteful steps of powder feeders traveling without depositing powder. For example, the print system 600 includes two powder feeders 650, 655, which are configured to distribute or apply powder one layer at a time over a substrate 670 in various directions. Accordingly, the powder feeders 650, 655 improve printing efficiency of the print system 600 by being able to deposit powder in various directions without any wasteful movement.

In some embodiments, the powder feeders 650, 655 may be discrete devices, disposed next to each other and configured to move together as a unit. As an example, the powder feeders 650, 655 may be integrated into a single device allowing them to move in a synchronized fashion as a pair. Alternatively, the powder feeders 650, 655 may be integrated as single devices allowing them to move independently from one another. As a specific example, powder feeder 650 is activated to distribute powder and performs a pass from right to left over substrate 670, while powder feeder 655 is prevented from distributing powder. Similarly, as powder feeder 655 performs a pass from left to right over the substrate 670, it is activated to distribute powder, and powder feeder 650 is prevented from distributing powder. In further examples, powder feeders 650, 655 may be stationary, and the substrate 670 may move beneath them. In this example, the direction of travel of the substrate 670 determines which powder feeder of powder feeders 650, 655 is activated to distribute powder and which is prevented from doing so. In this way, activation of the powder feeders 650, 655 are synchronized with a direction of travel of the powder feeders 650, 655 and/or the substrate 670 over which they travel.

In some embodiments, the directions 660, 665 are opposing directions, with direction 660 opposing direction 665, and vice versa. As shown in FIG. 6, powder uniformization device 640 is rotatable in directions 645, 645*a*, along the substrate 670. Specifically, the roller of the powder uniformization device 640 is a counter-rotating roller, such as described with respect to rollers 240, 340, and operates to compact the powder that has been dispensed by the powder feeders 650, 655. In this way, the powder uniformization device 640 is able to uniformize powder deposited by the powder feeders 650, 655, regardless of a direction of the directions 660, 665 the powder feeders 650, 655 move along.

As an example, in order to accommodate both powder feeders 650, 655, the powder uniformization device 640 is configured to rotate in whichever direction of the directions 645, 645*a* that is appropriate based on whether powder feeder 650 or powder feeder 655 is activated and dispensing powder. As a more specific example, the powder uniformization device 640 rotates in a clockwise direction 645 when powder feeder 650 is activated, i.e., as it moves from right to left, in direction 660. Further, the powder uniformization device 640 rotates in counter-clockwise direction 645*a* when powder feeder 655 is activated, i.e., as it moves from left to right, in direction 665. In this way, to accommodate a plurality of materials deposited by the powder feeders 650, 655, the powder uniformization device 640 needs to rotate in one direction for a first powder from powder feeder of the powder feeders 650, 655, and an opposite direction for a second powder from powder feeder of the powder feeders 650, 655. Alternatively, the powder uniformization device 640 may comprise a plurality of powder uniformization devices; with each of the plurality of powder uniformization devices activated to rotate in a direction synchronized with the movement and activation of one of the powder feeders 650, 655. Such a configuration can help prevent powder cross contamination when a plurality of materials is deposited.

In some embodiments, synchronization of the roller of the powder uniformization device 640 is based on which direction a powder feeder of the powder feeders 650, 655 is moving relative to the substrate 670, or which direction the substrate 670 is moving relative to the powder feeders 650, 655. In further embodiments, a powder uniformization device controller may control a rotation direction of the roller of the powder uniformization device 640, based on data related to a direction of the directions 660, 665 of the powder feeders 650, 655, data related to activation of the powder feeders 650, 655, and/or the direction of the substrate 670.

In some embodiments, each direction of the directions 660, 665 is relative to the substrate 670 in response to the substrate 670 being static. In this embodiment, the print system 600 is movable along a longitudinal axis, while the substrate 670 remains static. In this way, each powder feeder of the powder feeders 650, 655 is synchronized depending on which direction the powder feeders 650, 655 are moving relative to the substrate 670. Alternatively, the substrate 670 is movable along a longitudinal axis relative to the powder feeders 650, 655, thereby dictating which powder feeder of the powder feeders 650, 655 needs activation. In this way, each powder feeder of the powder feeders 650, 655 is synchronized depending on which direction the substrate 670 is moving relative to the powder feeders 650, 655. As a specific example, powder feeders 650, 655 may be stationary, and the substrate 670 may move beneath them. In this example, the direction of travel of the substrate 670 determines which powder feeder of the powder feeders 650, 655 is activated to distribute powder and which is prevented from doing so. In further embodiments, the substrate 670 is movable with respect to the print system 600 along a longitudinal axis. Accordingly, print system 600 allows for powder from the powder feeders 650, 655 to be deposited on the substrate 670, regardless of which direction the substrate 670 is moving.

Figure 7:
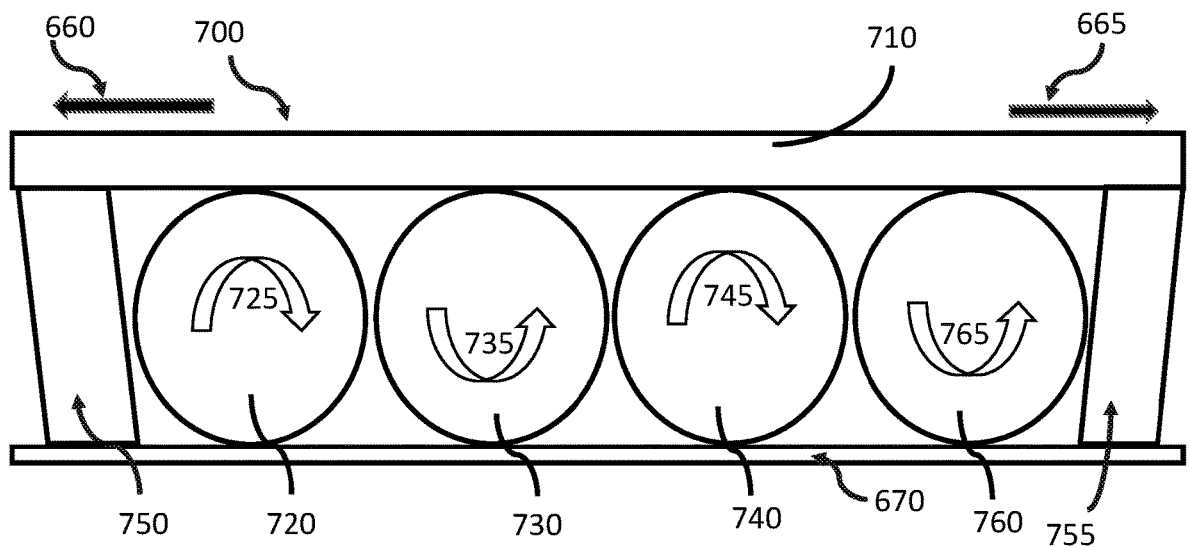
FIG. 7 illustrates a schematic representation of a print system in accordance with various example implementations.

FIG. 7 illustrates a schematic representation of a print system 700 in accordance with various example implementations described with respect to FIGS. 1-6. With reference to FIGS. 1-6, print system 700 includes a plurality of powder feeders 750, 755, each having a blade-shaped end. Further, FIG. 7 illustrates each powder feeder of the powder feeders 750, 755 is attached to a support or mounting apparatus 710.

The print system 700 includes powder uniformization devices 720, 760, located adjacent to at least one powder feeder of the plurality of powder feeders 750, 755. The powder uniformization devices 720, 760 uniformize powder deposited by the powder feeders 750, 755 onto the substrate 670. In some embodiments, the powder uniformization devices 720,760 may include a roller which corresponds to rollers 340, 440, 640 and may include all of their features as described with respect to FIGS. 3A, 3B, 4A, 4B and 6. For example, powder uniformization devices 720, 760 may rely on counter-rotating rollers to promote uniformity of the deposited powder. In some implementations, the powder uniformization devices 720, 760 may be attached to the support or mounting apparatus 710 in a manner that allows them to be moved in a direction substantially perpendicular to the substrate 670. For a uniformization device of the uniformization devices 720, 760 which is not activated to rotate, a roller gap may be increased, and for a uniformization device of the uniformization devices 720, 760 which is activated to rotate, the roller gap may be adjusted to define a thickness of the printed layer.

The powder feeders 750, 755 may contain different powder materials, and utilization of two powder uniformization devices 720,760 ensures that there is no powder cross contamination. As a specific example, the powder uniformization device 720 rotates in a clockwise direction 725 when powder feeder 750 is activated, i.e., as it moves from right to left, in the direction 660. The powder uniformization device 760 rotates in a counter-clockwise direction 765 when powder feeder 755 is activated, i.e., as it moves from left to right, in direction 665. In this way, each of the plurality of powder uniformization devices 720, 760 is configured to be activated to rotate in a direction synchronized with the movement and activation of one of the powder feeders 750, 755. Such a configuration can help prevent powder cross contamination when a plurality of materials is deposited.

In some embodiments, synchronization of the powder uniformization devices 720, 760 is based on which direction a powder feeder of the powder feeders 750, 755 is moving relative to the substrate 670, or which direction the substrate 670 is moving relative to the powder feeders 750, 755. In some embodiments, each direction of the directions 660, 665 is relative to the substrate 670 in response to the substrate 670 being static. In this embodiment, the print system 700 is movable along a longitudinal axis, while the substrate 670 remains static. In this way, each powder feeder of the powder feeders 750, 755 is synchronized depending on which direction the powder feeders 750, 755 are moving relative to the substrate 670. Alternatively, the substrate 670 is movable along a longitudinal axis relative to the powder feeders 750, 755, thereby dictating which powder feeder of the powder feeders 750, 755 needs activation. In this way, each powder feeder of the powder feeders 750, 755 is synchronized depending on which direction the substrate 670 is moving relative to the powder feeders 750, 755.

In some implementations, the print system 700 further comprises additional compaction devices 730, 740, that are configured to rotate in the same direction of the spreading of the deposited powder (directions 735 and 745) i.e., rotate in the opposite direction to the directions 725, 765 of the counter-rotating rollers of the uniformization devices 720, 760. In other implementations, the print system 700 may be configured such that powder uniformization devices 720, 760 serve as both uniformization devices and additional compaction devices. For example, when powder feeder 750 is activated, i.e., as it moves from right to left, in direction 660, the powder uniformization device 720 rotates in a clockwise direction 725 and the powder uniformization device 760 is operated as an additional compaction device rotating in a counterclockwise direction 765, i.e., in the opposite direction to the direction of 725. Similarly, when powder feeder 755 is activated, i.e., as it moves from left to right, in direction 665, the powder uniformization device 760 rotates in the counter-clockwise direction 765 and the powder uniformization device 720 is operated as an additional compaction device rotating in a clockwise direction 725, i.e., in the opposite direction to the direction of 765.

Figure 8:
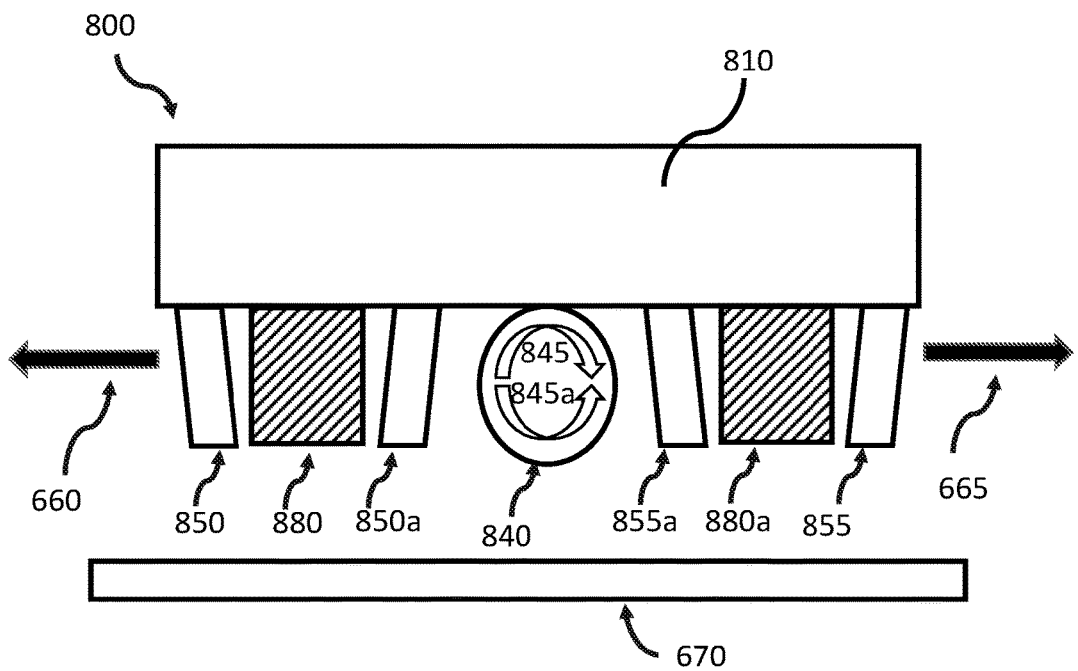
FIG. 8 illustrates a schematic representation of a print system in accordance with various example implementations.

FIG. 8 illustrates a schematic representation of print system 800 in accordance with various example implementations described with respect to FIGS. 1-7. Print system 800 includes a plurality of powder feeders 850, 850a, 855, 855a. The powder feeders 850, 850a, 855, 855a may dispense the same powder as each other, or different powders, allowing for multi-material deposition. In some configurations, powder feeders 850, 855a may dispense a first powder material, and powder feeders 850a, 855 may dispense a second powder material. The print system 800 may include one or more of the features described in relation to FIGS. 6 and 7, with the powder feeders 650, 655, 750, 755, and powder uniformization devices 640, 720, 760. For example, in embodiments, the powder feeders 850, 850a, 855, 855a may correspond to powder feeders 350, 450, and may include all of their features as described with respect to FIGS. 3A, 3B, 4A, and 4B, including each powder feeder of the powder feeders 850, 850a, 855, 855a having a blade-shaped end.

In some embodiments, the print system 800 may further comprise a carrier device, such as the carrier device 12 illustrated in FIG. 1 (which may include a conveyor) to transport the substrate 670 from a first location to a second location.

As shown in FIG. 8, the print system 800 includes a uniformization device, i.e., powder uniformization device 840, located adjacent to powder feeders 850, 850a, 855, 855a, for example between the plurality of powder feeders 850, 850a, 855, 855a. The powder uniformization device 840 uniformizes powder deposited by the powder feeders 850, 850a, 855, 855a onto the substrate 670, and rotates in clockwise direction 845 and/or counter-clockwise direction 845a. In some embodiments, the powder uniformization device 840 may include a roller which corresponds to rollers 340, 440, and may include all of their features as described with respect to FIGS. 3A, 3B, 4A, and 4B. In some embodiments, two or more of the powder feeders 850, 850a, 855, 855a may contain different powder materials, and/or powder uniformization device 840 may comprise two or more powder uniformization devices (not shown). The implementation of two or more powder uniformization devices ensures that there is no powder cross contamination. For example, in a case where powder feeders 850, 855a dispense a first powder material, and powder feeders 850a and 855 dispense a second powder material, powder uniformization device 840 may comprise two independent powder uniformization devices 840a and 840b (not shown). With powder uniformization 840a operated to uniformize powder deposited by the powder feeders 850, 855a, and powder uniformization 840b operated to uniformize powder deposited by the powder feeders 850a, 855.

In embodiments, the powder feeders 850, 850a, 855, 855a may be discrete devices, disposed next to each other and configured to move together as a unit. As an example, the powder feeders 850, 850a may be integrated into a single device allowing them to move in a synchronized fashion as a pair. Alternatively, the powder feeders 850, 850a, 855, 855a may be integrated as single devices allowing them to move independently from one another. As a specific example, the powder feeders 850, 850a, 855, 855a are synchronized with a direction of travel of the powder feeders 850, 850a, 855, 855a and/or the substrate 670 over which they travel. In further examples, powder feeders 850, 850a, 855 and 855a may be stationary, and the substrate 670 may move beneath them. In this example, the direction of travel of the substrate 670 determines which powder feeder of powder feeders 850, 850a, 855 and 855a is activated to distribute powder, and which powder feeder is prevented from doing so.

To accommodate a plurality of materials deposited by the powder feeders 850, 850a, 855, 855a, in one embodiment the powder uniformization device 840 is configured to rotate in one direction when powder is distributed from two of the powder feeders from the powder feeders 850, 850a, 855, 855a, (for example powder feeders 850, 855a), and an opposite direction when powder is distributed from the other two powder feeders 850, 850a, 855, 855a, (for example powder feeders 850a, 855). Alternatively, the powder uniformization device 840 may comprise a plurality of powder uniformization devices, each of the plurality of powder uniformization devices activated to rotate in a direction synchronized with the movement and activation of one or more of the powder feeders 850, 850a, 855, 855a. Such a configuration can help prevent powder cross contamination when a plurality of materials is deposited. In yet another embodiment, the powder uniformization devices may be attached to the support or mounting apparatus 810 in a manner that allows them to be moved in a direction substantially perpendicular to the substrate 670. In a further embodiment, the powder uniformization devices may be attached to the support or mounting apparatus 810 in a manner that allows them to be moved in a direction at an angle less than 90 degree to the substrate 670. For those uniformization devices which are not activated to rotate, the roller gap may be increased, and for those uniformization devices which are activated to rotate, the roller gap may be adjusted to define the final thickness of the printed layer.

The print system 800 includes a plurality of binder jetting devices 880, 880a. In one embodiment, the binder jetting devices 880, 880a are integrated with the powder feeders 850, 850a, 855, 855a to provide a unit that can move as a single device arrangement in a single pass. For example, the binder jetting device 880 may be integrated with powder feeders 850, 850a to provide a unit that can move as a single device arrangement in a single pass. In a further embodiment, the print system 800 allows for powder to be deposited by powder feeders 850, 850a, 855, 855a, along with an injection of a binder, e.g., a UV-curable resin, by the binder jetting devices 880, 880a. In further embodiments, the print system 800 allows for the application of a fixing device, e.g., a UV radiation device, to cure the UV-curable resin. As a result, the speed of the layer formation and binder curing is substantially increased because there is no need for an additional post-deposition curing process. In some embodiments, the powder feeders 850, 850a, 855, 855a and/or the powder uniformization device 840 are synchronized with the binder jetting devices 880, 880a. Similarly, any other devices, such as a fixing device, are similarly synchronized to be activated based on the direction of the powder feeders 850, 850a, 855, 855a, which are activated, and their location with respect to the substrate 670.

Figure 9:
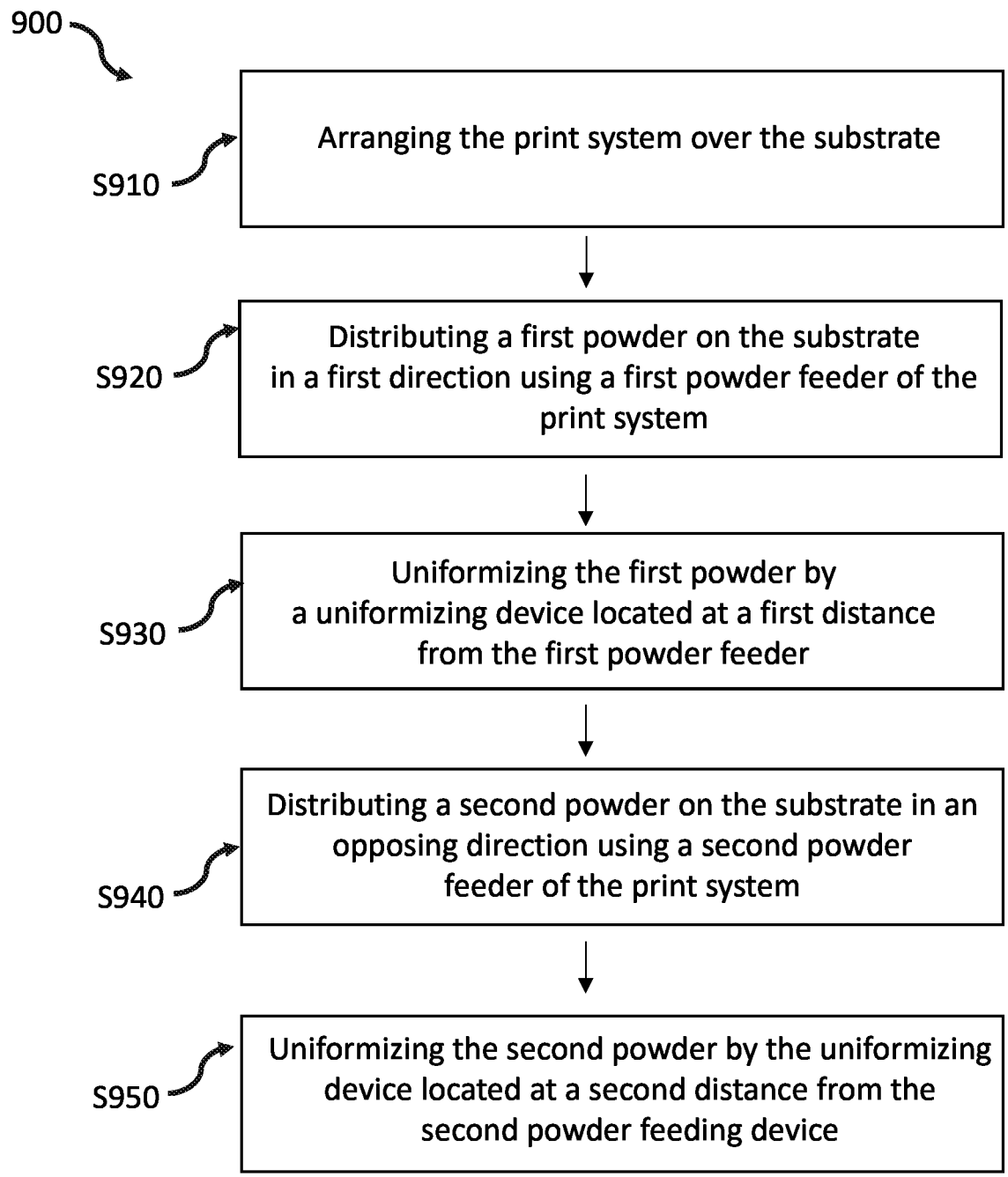
FIG. 9 illustrates a method of operation of a 3D print station in accordance with various example implementations.

FIG. 9 illustrates a method of operation of a print system in a 3D printing apparatus, in accordance with various example implementations. In the process 900 of FIG. 9, at S910, a print system of the print systems 600, 700, 800 is arranged over a substrate 670, as shown in FIGS. 6-8. At S920, a first powder is distributed on the substrate 670 in a first direction, e.g., direction 660, using a first powder feeder of the powder feeders 650, 655 of the print system 600, the powder feeders 750, 755 of the print system 700, or powder feeders 850, 850a, 855, 855a of the print system 800. At S930, a uniformization device, i.e., powder uniformization device 640, 720, 760 or 840, located at a first distance from the first powder feeder, uniformizes the first powder. At S940, a second powder is distributed on the substrate 670 in a second direction, e.g., direction 665 opposing the first direction 660, using a second powder feeder of the powder feeders 650, 655 of the printing system 600, powder feeders 750, 755 of the print system 700, or powder feeders 850, 850a, 855, 855a of the print system 800. At S950, the uniformization device, e.g., powder uniformization device 640, 720, 760 or 840 located at a second distance from the second powder feeder, uniformizes the second powder. In some embodiments the first powder dispensed may be the same or a different material from the second powder dispensed.

In the following, further features, characteristics, and advantages of the instant application will be described via the following items:

Item 1: A three-dimensional ("3D") printing system for printing on a substrate, the printing system comprising: a powder distribution device dispensing powder on the substrate and including a blade-shaped end, the blade-shaped end disposed at a height above the substrate; a powder uniformization device located at a distance from the powder distribution device along a direction substantially parallel to a longitudinal axis of the substrate; one or more sensors disposed upstream from the powder uniformization device and configured to determine one or more parameters of a thickness of the dispensed powder at one or more locations; and a control apparatus configured to determine whether the one or more parameters of the thickness is above a predetermined threshold value, and if the one or more parameters is determined to be above the predetermined threshold value, to adjust the powder distribution device.

Item 2: The printing system of item 1, wherein the one or more sensors is disposed between the blade-shaped end and the powder uniformization device.

Item 3: The printing system of items 1 and 2, wherein the control apparatus is configured to adjust the height at which the blade-shaped end is disposed above the substrate.

Item 4: The printing system of items 1-3, wherein the height at which the blade-shaped end is disposed above the substrate is adjusted such that substantially no further powder from the powder distribution device approaches the powder uniformization device.

Item 5: The printing system of any one of items 1-4, wherein the control apparatus is configured to adjust an amount of the powder dispensed by the powder distribution device.

Item 6: The printing system of any one of items 1-5, wherein the powder distribution device is configured to dispense substantially no powder.

Item 7: The printing system of any one of items 1-6, wherein the further comprising an additional sensor to determine one or more additional parameters of the thickness at one or more locations downstream from the powder uniformization device, wherein the control apparatus is further configured to: determine whether the one or more additional parameters of the thickness at the one or more locations downstream from the powder uniformization device is above a predetermined target value, and if the one or more additional parameters is determined to deviate from the predetermined target value, to adjust the powder distribution device.

Item 8: The printing system of any one of items 1-7, wherein the adjusting the powder distribution device comprises adjusting the height at which the blade-shaped end is disposed above the substrate.

Item 9: The printing system of any one of items 1-8, wherein the adjusting the powder distribution device comprises adjusting an amount of the powder dispensed by the powder distribution device.

Item 10: The printing system of any one of items 1-9, further comprising an additional control apparatus configured to adjust a height of a lowest contact point of the powder uniformization device to the substrate if the thickness at the one or more locations downstream from the powder uniformization device deviates from the predetermined target value.

Item 11: The printing system of any one of items 1-10, wherein the one or more sensors and the control apparatus are configured to operate such that they provide dynamic adjustment of a powder uniformization process of the 3D printing system, to maintain a consistency of the powder uniformization process.

Item 12: A method for printing comprising: dispensing a powder on a substrate using a powder distribution device having a blade-shaped end, the blade-shaped end disposed at a height above the substrate; determining one or more parameters of a thickness of the dispensed powder at one or more locations using one or more sensors disposed upstream from a powder uniformization device; determining whether the one or more parameters is above a predetermined threshold value; and adjusting the powder distribution device in response to the one or more parameters being determined to be above the predetermined threshold value.

Item 13: The method of item 12, wherein the adjusting the powder distribution device comprises adjusting the height at which the blade-shaped end is disposed above the substrate.

Item 14: The method of items 12 and 13, wherein the adjusting the height at which the blade-shaped end is disposed above the substrate is adjusted such that substantially no further powder from the powder distribution device approaches the powder uniformization device.

Item 15: The method of any one of items 12-14, wherein the adjusting the powder distribution device comprises adjusting an amount of the powder dispensed by the powder distribution device.

Item 16: The method of any one of items 12-15, wherein the adjusting the amount of the powder dispensed by the powder distribution device comprises adjusting the powder distribution device so that substantially no powder is dispensed.

Item 17: The method of any one of items 12-16, further comprising: determining one or more additional parameters of the thickness at one or more locations downstream from the powder uniformization device using an additional sensor; and adjusting the powder distribution device in response to the one or more additional parameters being determined to deviate from a predetermined target value.

Item 18: The method of any one of items 12-17, wherein the adjusting the powder distribution device comprises adjusting the height at which the blade-shaped end is disposed above the substrate.

Item 19: The method of any one of items 12-18, wherein the adjusting the powder distribution device comprises adjusting the powder distribution device so that substantially no powder is dispensed.

Item 20: The method of any one of items 12-19, wherein the adjustment of the powder distribution device is dynamic, to maintain a consistency of a powder uniformization process provided by the powder uniformization device.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A three-dimensional ("3D") printing system for printing on a continuous substrate, the printing system comprising:
    a powder distribution device dispensing powder onto the continuous substrate and including a blade-shaped end, the blade-shaped end configured to be adjacent to a wall of the powder distribution device and disposed at a height above the continuous substrate, wherein the blade-shaped end extends along the wall of the powder distribution device towards the continuous substrate;
    a powder uniformization device located at a distance from the powder distribution device along a direction substantially parallel to a longitudinal axis of the continuous substrate, the powder uniformization device configured to press on and spread the dispensed powder;
    a carrier device comprising the continuous substrate configured to transport the powder dispensed onto the continuous substrate from the powder distribution device to a compaction device at a distal end of the carrier device;
    one or more sensors disposed upstream from the powder uniformization device and configured to determine one or more parameters of a thickness of the dispensed powder at one or more locations;
    a control apparatus, the control apparatus configured to determine whether the one or more parameters of the thickness is above a predetermined value as the continuous substrate moves to transport the dispensed powder downstream from the powder distribution device, and to adjust the powder distribution device when the one or more parameters is determined to be above the predetermined value; and
    the blade-shaped end positioned such that the thickness of the dispensed powder transported downstream by the carrier device away from the blade-shaped end of the powder distribution device is less than the thickness of the dispensed powder from the powder distribution device.

2. The 3D printing system of claim 1, wherein the one or more sensors is disposed between the blade-shaped end and the powder uniformization device.

3. The 3D printing system of claim 2, wherein the control apparatus is configured to dynamically adjust the height at which the blade-shaped end is disposed above the substrate based on real-time data from the one or more sensors while the powder is being dispensed onto the continuous substrate.

4. The 3D printing system of claim 3, wherein the height at which the blade-shaped end is disposed above the continuous substrate is adjusted such that substantially no further powder from the powder distribution device approaches the powder uniformization device.

5. The 3D printing system of claim 2, wherein the control apparatus is configured to dynamically adjust an amount of the powder dispensed by the powder distribution device based on real-time data from the one or more sensors.

6. The 3D printing system of claim 5, wherein the powder distribution device is configured to dispense substantially no powder.

7. The 3D printing system of claim 2, further comprising an additional sensor to determine one or more additional parameters of the thickness at one or more locations downstream from the powder uniformization device, wherein the control apparatus is further configured to:
    determine whether the one or more additional parameters of the thickness at the one or more locations downstream from the powder uniformization device is above a predetermined target value, and
    dynamically adjust the powder distribution device, when the one or more additional parameters is determined to deviate from the predetermined target value, based on real-time data from the one or more sensors while the powder is being dispensed onto the continuous substrate.

8. The 3D printing system of claim 7, wherein the adjusting the powder distribution device comprises adjusting the height at which the blade-shaped end is disposed above the continuous substrate.

9. The 3D printing system of claim 7, wherein the adjusting the powder distribution device comprises adjusting an amount of the powder dispensed by the powder distribution device.

10. The 3D printing system of claim 7, further comprising an additional control apparatus configured to adjust a height of a lowest contact point of the powder uniformization device to the continuous substrate if the thickness at the one or more locations downstream from the powder uniformization device deviates from the predetermined target value.

11. The 3D printing system of claim 2, wherein the one or more sensors and the control apparatus are configured to operate such that they provide dynamic adjustment of a powder uniformization process of the 3D printing system, to maintain a consistency of the powder uniformization process.

12. The 3D printing system of claim 1, wherein the one or more sensors is disposed between the blade-shaped end and the powder uniformization device.

13. The 3D printing system of claim 1, wherein the control apparatus adjusts the powder distribution device when the one or more parameters is determined to be above the predetermined value.

14. The 3D printing system of claim 1, wherein a bottom surface of the blade-shaped end is parallel to a bottom surface of the powder distribution device.

15. The 3D printing system of claim 1, wherein the control apparatus is configured to gradually reduce a thickness level of the powder deposited by the powder distribution device as the powder moves towards the distal end of the carrier device.

16. The 3D printing system of claim 1, wherein the powder uniformization device is a counter-rotating roller, and the control apparatus adjusts a height of the counter-rotating roller based on real-time data from the one or more sensors.

17. The 3D printing system of claim 1, wherein the control apparatus adjusts a height of one or more counter-rotating rollers downstream from the powder distribution device based on real-time data from the one or more sensors.

18. The 3D printing system of claim 1, wherein the control apparatus adjusts a height of the blade-shaped end and the amount of powder dispensed by the powder distribution device based on real-time data from the one or more sensors.

19. The 3D printing system of claim 1, further comprising one or more additional sensors to acquire a powder surface height measurement of the powder surface at one or more locations downstream of the powder uniformization device.

20. The 3D printing system of claim 1, wherein carrier device is a conveyor configured to transport or move powder on the continuous substrate from a first position to a second position.

* * * * *